US009661348B2

United States Patent
Liao et al.

(10) Patent No.: US 9,661,348 B2
(45) Date of Patent: May 23, 2017

(54) METHOD AND SYSTEM FOR GENERATING SIDE INFORMATION AT A VIDEO ENCODER TO DIFFERENTIATE PACKET DATA

(75) Inventors: Yiting Liao, Hillsboro, OR (US); Jeffrey R. Foerster, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1161 days.

(21) Appl. No.: 13/433,821

(22) Filed: Mar. 29, 2012

(65) Prior Publication Data

US 2013/0259136 A1 Oct. 3, 2013

(51) Int. Cl.
*H04N 7/26* (2006.01)
*H04N 19/66* (2014.01)
*H04N 19/37* (2014.01)
*H04N 19/895* (2014.01)

(52) U.S. Cl.
CPC ............. *H04N 19/66* (2014.11); *H04N 19/37* (2014.11); *H04N 19/895* (2014.11)

(58) Field of Classification Search
CPC ....... H04N 19/37; H04N 19/66; H04N 19/895
USPC ............ 375/240.24, 240.27, 240.16, 240.12, 375/E7.026, 240
See application file for complete search history.

(56) References Cited

U.S. PATENT DOCUMENTS

| 5,872,807 | A | 2/1999 | Booth et al. |
| 6,175,259 | B1 | 1/2001 | Mann et al. |
| 6,606,005 | B2 | 8/2003 | Chang |
| 6,826,233 | B1 * | 11/2004 | Oosawa ................ H04L 1/0041 375/240.24 |
| 7,042,258 | B2 | 5/2006 | Booth et al. |
| 2003/0099298 | A1 * | 5/2003 | Rose .................... H04N 21/234 375/240.27 |
| 2005/0169312 | A1 | 8/2005 | Cakareski et al. |
| 2007/0030894 | A1 | 2/2007 | Tian et al. |
| 2007/0160137 | A1 | 7/2007 | Guo et al. |
| 2008/0089414 | A1 * | 4/2008 | Wang ............... H04N 21/44209 375/240.13 |
| 2008/0107154 | A1 | 5/2008 | Hsiao-Chyi |

(Continued)

FOREIGN PATENT DOCUMENTS

| TW | 201028015 A | 7/2010 |
| TW | 201105112 A | 2/2011 |

(Continued)

OTHER PUBLICATIONS

Liao et al., "Rate-distortion based mode selection for video coding over wireless networks with burst losses," in Packet Video Workshop, 2009. PV 2009. 17th International, vol., No., pp. 1-10, May 11-12, 2009, hereinafter "Liao".*

(Continued)

*Primary Examiner* — William C Vaughn, Jr.
*Assistant Examiner* — Naod Belai
(74) *Attorney, Agent, or Firm* — Buckley, Maschoff & Talwalkar LLC

(57) ABSTRACT

A system and method for generating, by a video encoder, side information associated with a plurality of blocks of pixel data, the side information providing for each block of pixel data an indication of a video quality impact in an instance the block of pixel data is lost in the network.

16 Claims, 4 Drawing Sheets

(56) References Cited

U.S. PATENT DOCUMENTS

2009/0103635 A1* 4/2009 Pahalawatta ............ H04L 1/007
                                                    375/240.27
2011/0080952 A1   4/2011 Vadapalli et al.

FOREIGN PATENT DOCUMENTS

WO   2007/084475 A2   7/2007
WO   2012/001377 A2   2/2012

OTHER PUBLICATIONS

"PCT Notification of Transmittal of the International Search Report and the Written Opinion of the International Searching Authority, or the Declaration", May 29, 2013, for International Application No. PCT/US2013/024864, 10pgs.

"Notification Concerning Transmittal of International Preliminary Report on Patentability, Chapter I of the Patent Cooperation Treaty", Oct. 9, 2014, for International Application No. PCT/US2013/031536, 6 pgs.

"English Translation of Search Report of R.O.C.", for Taiwan Patent Application No. 102104861, completed Mar. 21, 2016, 1 page.

"Korean Office Action: The Notice of Preliminary Rejection", dated Oct. 30, 2015, for Korean Application No. 2014-7027169, 5pgs.

"English Translation of Korean Office Action: The Notice of Preliminary Rejection", dated Oct. 30, 2015, for Korean Application No. 2014-7027169, 4pgs.

Supplementary European Search Report, Application No. EP 13 76 9932 (mailed Sep. 8, 2016).

Buccioll P et al "Cross-Layer Perceptual ARQ for H.246 Video Streaming," IEEE Global Telecommunications conference, vol. 5, Nov. 29, 2004.

De Vito F et al., "Perceptual Classification of MPEG Video for Differentiated—Services Communications," IEE International Conference on Multimedia and Expo, vol. 1, Aug. 26, 2002.

De Martin J C et al., "Distortion-Based Packet Marking for MPEG Video Transmission," IEEE International Conference on Multimedia and Expo, Aug. 22, 2001.

Bormans J et. al., "Video Coding With H.264/AVC: Tools, Performance, and Complexity," IEEE Circuits and Systems Magazine, vol. 4. No. 1, Jan. 1, 2004.

"Extended Supplementary European Search Report", European Patent Office, mailed Nov. 7, 2016, for EP Application No. 13769932.8, 13 pgs.

Quaglia, Davide et al., "Adaptive Packet Classification for Constant Perceptual Quality of Service Delivery of Video Streams Over Time-Varying Networks", IEEE International Conference on Multimedia and Expo, vol. 3, Jul. 6, 2003, XP010651162, ISBN: 978-0-7803-7965-7, (pp. 369-372, 4 total pages).

"Chinese Office Action", mailed Dec. 23, 2016 (Dec. 23, 2016), for Chinese Application No. 201380017501.4, 9 pgs.

* cited by examiner

100

GENERATE A PLURALITY OF BLOCKS OF PIXEL DATA
COMPRISING A VIDEO BITSTREAM

105

GENERATE SIDE INFORMATION ASSOCIATED WITH THE
PLURALITY OF BLOCKS OF PIXEL DATA

110

METHOD AND SYSTEM FOR GENERATING SIDE INFORMATION AT A VIDEO ENCODER TO DIFFERENTIATE PACKET DATA

BACKGROUND

Video systems have been developed, in part, to transmit video and multimedia data over networks. In some instances, the networks may be wired or wireless and may include television broadcast, satellite, cellular, and WiFi networks. Important to a video experience is the quality of video received for viewing by a user. In the event parts of the video received at a receiving end of a video transmission are lost in the transmitting of the data (e.g., a lossy network), then the user's video viewing experience may be compromised due to video degradation.

A number of techniques have been proposed to compensate for lost video data by making adjustments at the receiving end of a video transmission link. In many respects, such previous techniques operate by considering an average packet loss rate for the data transmitted over a video transmission channel and based on the average packet loss rate for the transmitted video, compensating for that average packet loss rate.

While techniques considering an average packet loss rate for a video transmission channel may or may not address some broad video quality issues to an extent, such methods and systems are not typically adaptive or responsive to a variety transmitted types of video. Improving the effectiveness and efficiency of video transmissions and other data based on information specific to the transmitted data is therefore seen as important.

BRIEF DESCRIPTION OF THE DRAWINGS

Aspects of the present disclosure herein are illustrated by way of example and not by way of limitation in the accompanying figures. For purposes related to simplicity and clarity of illustration rather than limitation, aspects illustrated in the figures are not necessarily drawn to scale. Further, where considered appropriate, reference labels have been repeated among the figures to indicate corresponding or analogous elements.

DETAILED DESCRIPTION

The following description describes a method or system that may support processes and operation to improve effectiveness and an efficiency of a video transmission by providing a mechanism to estimate a packet loss impact due to the loss of each individual packet of a video bitstream. The disclosure herein provides numerous specific details such regarding a system for implementing the processes and operations. However, it will be appreciated by one skilled in the art(s) related hereto that embodiments of the present disclosure may be practiced without such specific details. Thus, in some instances aspects such as control mechanisms and full software instruction sequences have not been shown in detail in order not to obscure other aspects of the present disclosure. Those of ordinary skill in the art will be able to implement appropriate functionality without undue experimentation given the included descriptions herein.

References in the present disclosure to "one embodiment", "some embodiments", "an embodiment", "an example embodiment", "an instance", "some instances" indicate that the embodiment described may include a particular feature, structure, or characteristic, but that every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Some embodiments herein may be implemented in hardware, firmware, software, or any combinations thereof. Embodiments may also be implemented as executable instructions stored on a machine-readable medium that may be read and executed by one or more processors. A machine-readable storage medium may include any tangible non-transitory mechanism for storing information in a form readable by a machine (e.g., a computing device). In some aspects, a machine-readable storage medium may include read only memory (ROM); random access memory (RAM); magnetic disk storage media; optical storage media; flash memory devices; and electrical and optical forms of signals. While firmware, software, routines, and instructions may be described herein as performing certain actions, it should be appreciated that such descriptions are merely for convenience and that such actions are in fact result from computing devices, processors, controllers, and other devices executing the firmware, software, routines, and instructions.

Figure 1:
FIG. 1 is a flow diagram of a process, in accordance with an embodiment herein.

FIG. 1 is an illustrative flow diagram of a process 100 in accordance with an embodiment herein. Process 100 may provide a mechanism or technique for providing side information associated with a encoded video bitstream (also referred to herein as "video" or "video bitstream"). As used herein, side information may relate to the encoded video bitstream and include any additional information or data. In some aspects the side information may be generated and associated with the encoded video bitstream at a video encoder. In some embodiments, a video sequence encoded by a video encoder may have side information generated for the encoded video bitstream by the video encoder.

At operation 105, a plurality of blocks of pixel data comprising a encoded video bitstream are generated. The plurality of blocks of pixel data may be generated by a video encoder. The generated blocks of pixel data may be configured as packets of data, in accordance with one or more video transmission protocols. The size and structure of the packet may be based, in part, on the particular video transmission protocol used. The plurality of blocks of pixel data may typically be transmitted over a network via a transmission channel to a video receiver. The video receiver may include a video decoder to decode the encoded video bitstream.

A video sequence encoded by a video encoder may have side information generated for the video sequence by the video encoder. At operation 110, side information associated with the plurality of blocks of pixel data is generated. In some aspects, the side information may, in at least some part, be descriptive of the video sequence with which it is associated. In some aspects, the side information may be used to enhance or process the encoded video bitstream, including transmitting and processing the video based, at least in part, on data in the side information. In some aspects, processing of the video may include processing operations performed by a decoder at a receiver end of a transmission link. In some embodiments, the side information may include or form part of a header of the associated video, include metadata, or other data structures.

In general, the side information herein may include any additional information other than the encoded video bitstream. In some aspects, the side information may be encapsulated with the video (e.g., embedded in a header of transmitted video) or provided at a platform level by sharing the side information with other functional or operational blocks on the platform. In some aspects, the side information may include metadata descriptive of and associated with the encoded video bitstream.

Figure 2:
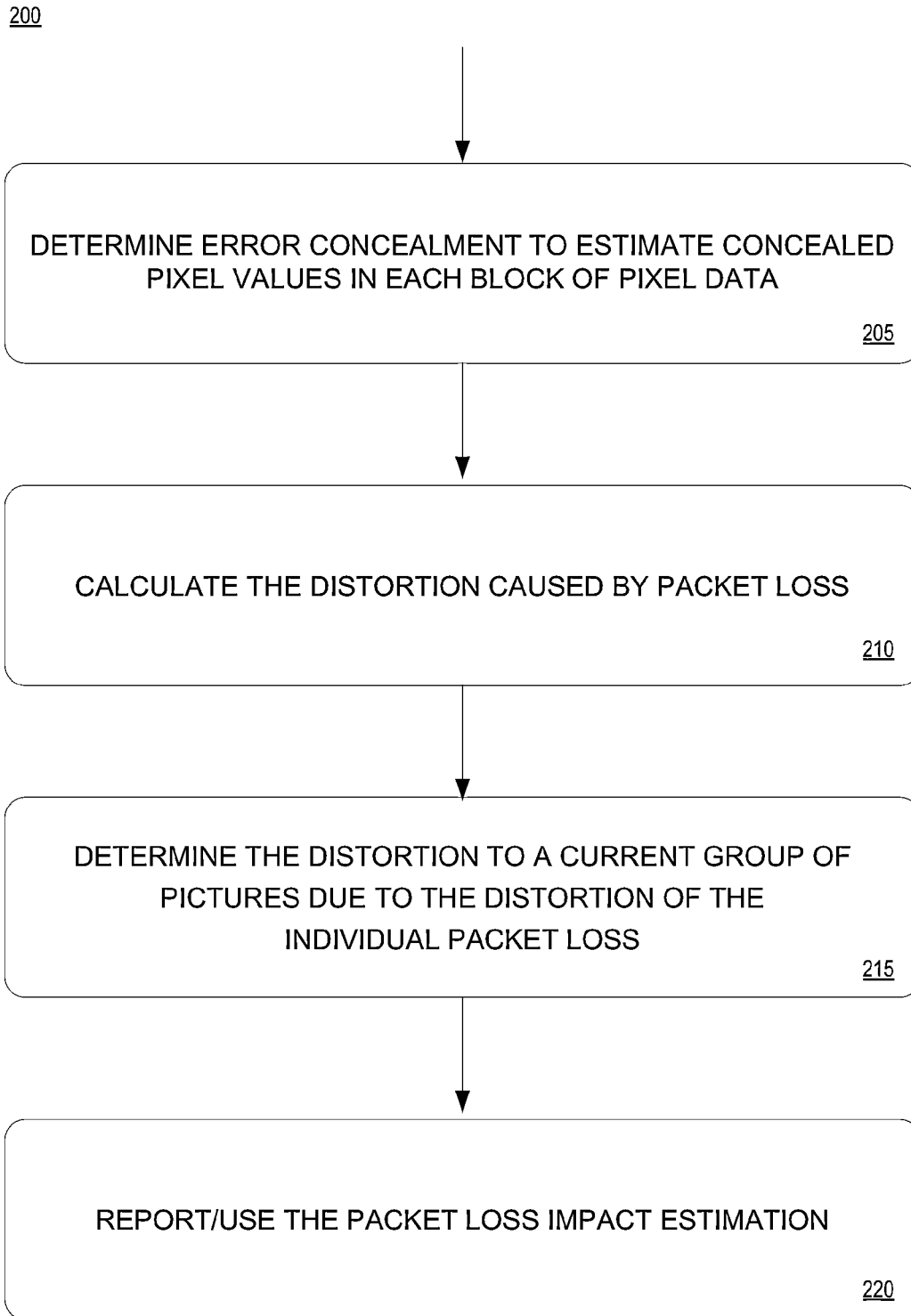
FIG. 2 is a flow diagram of a process, in accordance with one embodiment.

FIG. 2 is a flow diagram of a process 200, in accordance with some embodiments herein. Process 200 relates to some embodiments to differentiate the impact of the loss of individual packets of video from a encoded video bitstream. A video bitstream transmitted over a network may experiences quality degradation due to a loss of video packets. It is noted that different types of packet losses may have a different impact on the video quality degradation. In some embodiments, the present disclosure includes generating side information at a video encoder to differentiate the impact of individual packet loss. In some aspects, the estimation results for the individual packets may be used to classify the video packets into a number of different priority levels. The different priority classifications may be incorporated with cross-layer optimization techniques such as adaptive channel selection to improve the end-to-end video quality over a lossy network.

Figure 3:
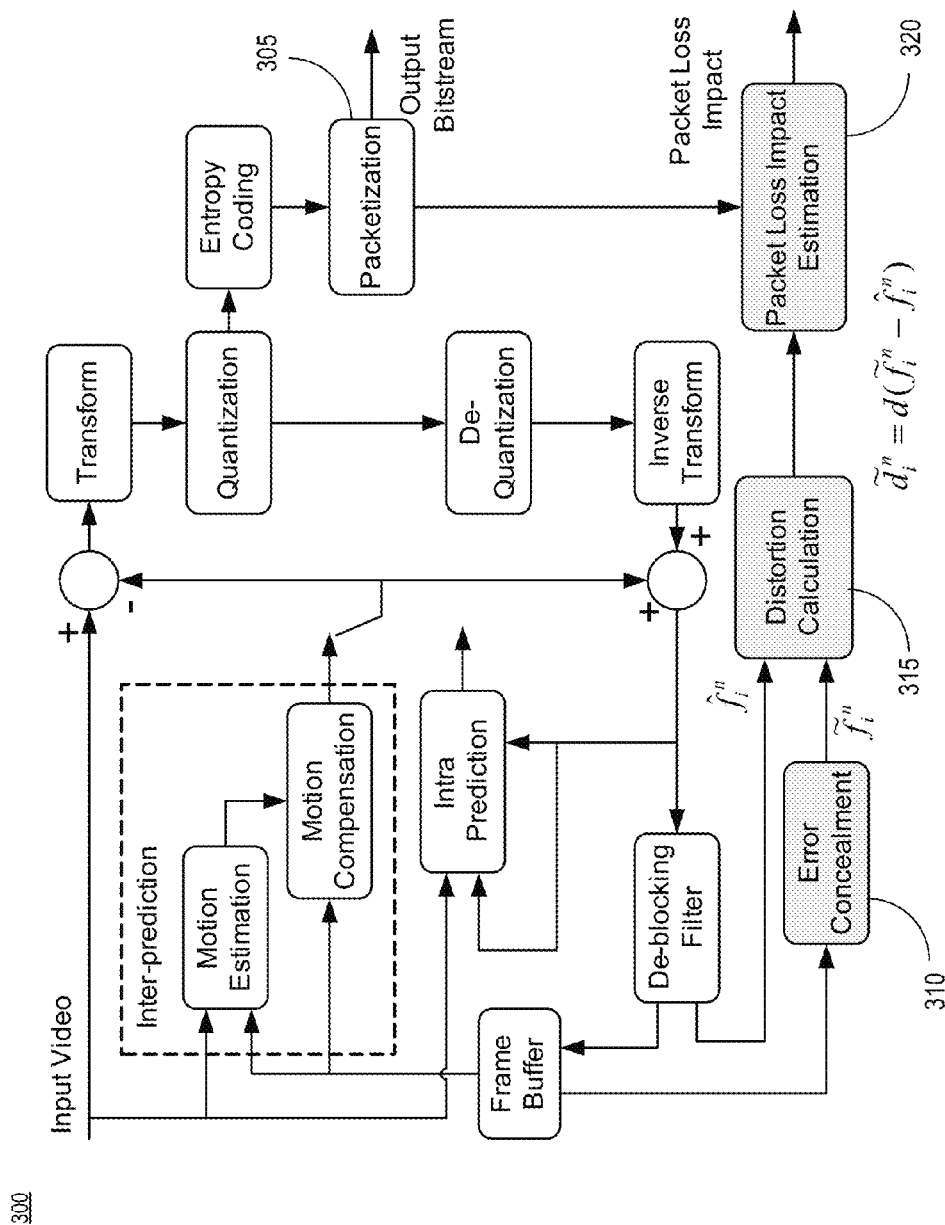
FIG. 3 is a schematic block diagram of a system, in accordance with an embodiment.

The flow diagram of FIG. 2 may be understood by referencing the schematic block diagram of a video encoder, according to some aspects herein. In some embodiments, three functional components may be included at a video encoder to estimate a video quality degradation caused by each individual packet loss. Accordingly, FIG. 2 will be discussed in conjunction with a video encoder 300 as illustrated in FIG. 3. System 300 may be implemented as hardware, software, firmware and combinations thereof. In some embodiments, system 300 includes a processor and associated memory (not shown) for implementing the functional modules depicted in FIG. 3.

At operation 205, video is received. The video may be received by video encoder 300 including functional components to implement the further operations of process 200. It is noted that an error concealment block may usually be implemented at a decoder to conceal the macroblocks (MBs) lost during a transmission of a video sequence encoded bitstream. In some embodiments herein, an error concealment module may be included at the encoder to estimate the concealed pixel values in each MB during the encoding process, as expressed at operation 205. In particular, video encoder 300 may include an error concealment module 310 to calculate how a packet of video will be concealed if that individual video packet were to be lost during a transmission of the video bitstream.

As an example, if frame copy concealment is used as the error concealment method to conceal lost pixels, then the lost pixel is concealed by copying from the collocated pixel in the previous frame. That is, the concealment pixel value $f_i^n$ (pixel i in frame n) = $f_i^{n-1}$, where $f_i^{n-1}$ is the compressed pixel value for pixel i in frame n-1 (i.e. the previous frame) and can be obtained from a frame buffer.

At operation 210, a distortion calculation is determined. In some embodiments, based on the estimated concealed pixel value and the compressed pixel value of operation 205, a value is calculated of the distortion caused by the packet loss at a pixel level. That is, a calculation is made to determine what distortion will be introduced if the (current) video packet is lost. For example, distortion calculation module 315 may calculate the distortion between the concealed video packet and the correctly received video packet.

As an example, different distortion metrics may be applied here to calculate the distortion. In some embodiments, a mean square error (MSE) is applied. In such embodiments, a distortion for pixel i in frame n may be expressed by $d_i^{\gamma n} = (f_i^n - \tilde{f}_i^n)^2$. Other distortion metrics may also be used, including MS-SSIM (Multi-scale Structural SIMilarity) and VQM (Video Quality Metric) as well as other reference and non-reference metrics.

At operation 215, an estimate of how the loss of the current video packet will impact future video frame quality is determined. Referring to FIG. 3, it is seen that the output from the packetization module 305 is received by packet loss impact module 320. Thus, the video encoder knows which MBs are encoded into a video packet. Accordingly, the distortion of each individual packet loss to the current video frame may be calculated by, for example, the expression of $D_p^{\gamma n} = \Sigma_{i \epsilon packet p} d_i^{\gamma n}$, where pixel i presents pixel value encoded in packet p and packet p contains MBs in frame n.

In some embodiments, the frame type and the frame index of a frame n are also known at the encoder. As such, the individual packet loss impact to the group of pictures (GOP) of the video can be estimated based on the above information and an error propagation pattern. For example, for an I (i.e., "intra-coded picture") or P (i.e., "predicted picture") frame, the errors in one frame usually propagates to all of the frames in the GOP while for a B (i.e., "Bi-predictive picture") frame, packet loss only causes distortion in the current frame. In the present disclosure, a model is built to estimate the packet loss impact to the GOP. The model assumes that errors in one frame will propagate constantly to the following frames in a GOP and a packet loss in a P frame causes significant distortion to the adjacent B frame. Thus, the packet loss impact of packet p to the GOP can be estimated by:

$$D_p^{GOP} = \frac{k_p \tilde{D}_p^n + D_{offset}}{GOP \text{ Size}}.$$

where $\rho_{type}$ is the frame type of packet p, $\rho_{index}$ is the frame index in the GOP of packet p, $k_p$ is the number of frames affected by the lost packet p defined as:

$$k_p = \begin{cases} GOP \text{ Size} & p_{type} = I \\ 1 & p_{type} = B \\ GOP \text{ Size} - p_{index} + 1 & p_{type} = P \end{cases}$$

and $D_{offset}$ is a constant to capture the distortion to the adjacent B frame:

$$D_{offset} = \begin{cases} 0 & p_{type} = I \text{ or } B \\ \text{constant} & p_{type} = P \end{cases}$$

In some embodiments, the particular algorithms used to determine the packet loss impact estimation herein may be varied to correspond to, for example, other error concealment techniques used by error concealment module 315. However, the general framework disclosed herein is applicable across a variety of use cases.

It is noted that the packet loss impact is calculated or estimated for each packet. Therefore, the side information output by packet loss impact estimation module 320 provides an indication of the importance of each individual video packet based on the packet loss visibility.

Returning to process 200, the process may proceed to operation 220. At operation 220, the individual packet loss impact determined at operation 215 may be reported, stored, or used in the transmission of the video bitstream. The individual packet loss impact may be used in some instances to dynamically adjust the transmission of the video, in an effort to minimize or eliminate the degradation of the video that would result from lost video packets. Thus, a video transmission method may be implemented that prioritizes video packets determined in operations 205-215 to significantly impact the quality of the video at a receiver end.

Applicant has realized the effectiveness of the methods disclosed herein by determining an estimation based on the methods and evaluating the performance of the estimation for three video sequences, including the publically available "Parkrun", "Stockholm", and "Shields" video sequences under different bitrates. The video sequences used had a video resolution of 1280×720 and a frame rate of 30 fps. A Vanguard H.264 Codec was used to encode the video in IBPBP coding structure with a GOP size of 30. PSNR (peak signal-to-noise ratio) and MS-SSIM (Multi-Scale Structural SIMilarity) were used as video quality metrics in the estimation method. Comparing the actual packet loss impact to the estimated packet loss impact for a first GOP of Stockholm encoded video at 2.277 Mbps, the estimation method herein accurately matches with the actual packet loss impact, where the mean PSNR and MS-SSIM estimation error are 0.14 and 0.0008, respectively.

Tables 1a and 1b below include mean estimation errors (i.e., mean absolute difference between actual and estimated results) for the Stockholm, Shields, and Parkrun video sequences under different bitrates. Table 1 a uses PSNR as the video quality metric and table 1b uses MS-SSIM as the video quality metric. As demonstrated in the tables 1a and 1 b, the estimation determined by the methods and processes disclosed herein compare very favorably to the actual observed losses.

TABLE 1a

| | Video | | | | | |
|---|---|---|---|---|---|---|
| | Stockholm | | Shields | | Parkrun | |
| | Bit rate (Mbps) | | | | | |
| | 1.1 | 2.3 | 1.4 | 2.5 | 1.6 | 5.9 |
| GOP1 | 0.18 | 0.14 | 0.09 | 0.12 | 0.19 | 0.18 |
| GOP2 | 0.27 | 0.19 | 0.09 | 0.13 | 0.17 | 0.17 |
| GOP3 | 0.18 | 0.16 | 0.08 | 0.12 | 0.19 | 0.17 |
| GOP4 | 0.14 | 0.12 | 0.09 | 0.11 | 0.16 | 0.17 |
| GOP5 | 0.18 | 0.14 | 0.09 | 0.15 | 0.17 | 0.17 |

TABLE 1b

| | Video | | | | | |
|---|---|---|---|---|---|---|
| | Stockholm | | Shields | | Parkrun | |
| | Bit rate (Mbps) | | | | | |
| | 1.1 | 2.3 | 1.4 | 2.5 | 1.6 | 5.9 |
| GOP1 | 0.0021 | 0.0008 | 0.0028 | 0.0010 | 0.0024 | 0.0015 |
| GOP2 | 0.0025 | 0.0014 | 0.0025 | 0.0010 | 0.0022 | 0.0011 |
| GOP3 | 0.0027 | 0.0011 | 0.0025 | 0.0012 | 0.0022 | 0.0013 |
| GOP4 | 0.0021 | 0.0009 | 0.0030 | 0.0011 | 0.0022 | 0.0010 |
| GOP5 | 0.0030 | 0.0010 | 0.0029 | 0.0010 | 0.0028 | 0.0015 |

In some aspects, the packet loss impact estimation determined by a method or process herein may be used to improve or enhance video transmission of a network. In some embodiments, an output of, for example, video encoder 300 at 320 can be used for a video adaptation scheme to improve an end-user's video quality experience.

As an example to demonstrate the effectiveness of methods and systems of the present disclosure, a use case is presented that incorporates the packet loss impact estimation herein with an adaptive channel selection. In the present example, it is assumed that three channels having a packet loss rate of 0%, 1% and 5% are available for video transmission. In a baseline scheme, each of the three available channels is randomly selected for transmission of one third of the video packets. According to an adaptive channel selection scheme using the packet loss impact estimation herein (e.g., a process that may include operation 220 of FIG. 2), the video packets may be equally divided into three priority levels based on the packet loss impact estimated by the packet loss impact technique(s) herein. The adaptive channel selection scheme may prioritize a packet with a greater quality impact by assigning it to a higher priority level than a packet with a lesser quality impact that will be assigned to a lower priority level. After prioritizing the video packets, the video packets may be transmitted over the three different channels based on their priority levels. In some embodiments, higher priority video packets may be transmitted over a channel having a lower packet loss rate.

In this use case, a Stockholm (300 frames) sequence is encoded and transmitted through the three channels using the baseline scheme and the adaptive channel selection scheme. The average PSNR over 20 runs for the baseline scheme and proposed scheme are 30.19 dB and 31.30 dB, respectively. Thus, it is seen that the packet loss impact estimation disclosed herein can be incorporated with a channel adaption method to improve the end-to-end video quality.

Figure 4A:
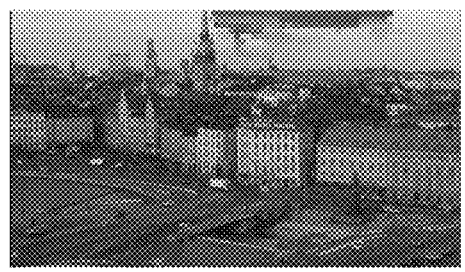
FIG. 4 are illustrative depictions of a video scene, in accordance with some embodiments herein.
Figure 4B:

FIGS. 4a and 4b depict screen shots resulting from the baseline scheme and the proposed adaptive channel selection scheme, respectively. The screen shots demonstrate that the proposed adaptive channel scheme enhances the user's video quality experience since, for example, the video of FIG. 4b (side information generated and used to enhance the video transmission) obtained using the adaptive channel selection scheme is not degraded as compared to FIG. 4a (no side information generated or used to enhance the video transmission).

All systems and processes discussed herein may be embodied in program code stored on one or more computer-readable media. Such media may include, for example, a floppy disk, a CD-ROM, a DVD-ROM, one or more types of "discs", magnetic tape, a memory card, a flash drive, a solid state drive, and solid state Random Access Memory (RAM), Read Only Memory (ROM) storage units, and other non-transitory media. Furthermore, the systems and apparatuses disclosed or referenced herein (e.g., system 200) may comprise hardware, software, and firmware, including general purpose, dedicated, and distributed computing devices, processors, processing cores, and microprocessors. In some aspects, the processes and methods disclosed herein may be delivered and provided as a service. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
   generating, by a video encoder, side information associated with a plurality of blocks of pixel data, the side information providing for each block of the plurality of blocks of pixel data an indication of a video quality impact due to a loss individually of each block of the plurality of blocks of pixel data; and
   transmitting, on multiple channels, a video bitstream comprising at least said plurality of blocks using an adaptive multiple channel selection process between the multiple channels based, at least in part, on the indication of a video quality impact in the side information for each block of the plurality of blocks,
   wherein said generating of the side information comprises:
   estimating concealed pixel values for the plurality of blocks of pixel data in an encoding process;
   calculating, based on estimated concealed pixel values, a distortion that will be caused by a loss of each of the plurality of blocks; and
   calculating a distortion for a current group of pictures based on the calculated distortion of each of the plurality of blocks comprising the current group of pictures.

2. The method of claim 1, wherein the group of pictures is a group of successive video frames starting with an I-frame.

3. The method of claim 1, further comprising assigning one of a plurality of priority levels to each of the plurality of blocks based on the indication of a video quality impact in the side information for each block of pixel data.

4. The method of claim 3, wherein a block of pixel data having a greater video quality impact is assigned a higher priority level than a block of pixel data having a lower video quality impact.

5. The method of claim 4, wherein the block of pixel data assigned with the higher priority is transmitted over a channel having a lower packet loss rate.

6. An apparatus comprising:
   a video encoder, configured to generate side information associated with a plurality of blocks of pixel data, the side information providing for each block of the plurality of blocks of pixel data an indication of a video quality impact due to a loss individually of each block of the plurality of blocks of pixel data; and
   at least one transmitter, configured to transmit on multiple channels, a video bitstream comprising at least said plurality of blocks using an adaptive multiple channel selection process between the multiple channels based, at least in part, on the indication of a video quality impact in the side information for each block of the plurality of blocks,
   wherein the video encoder comprises:
   an error concealment module configured to conceal pixel values for the plurality of blocks of pixel data in an encoding process;
   a distortion calculation module configured to calculate, based on estimated concealed pixel values, a distortion that will be caused by a loss of each of the plurality of blocks; and
   a packet loss impact estimation module configured to calculate a distortion for a current group of pictures based on the calculated distortion of each of the plurality of blocks comprising the current group of pictures.

7. The apparatus of claim 6, wherein the group of pictures is a group of successive video frames starting with an I-frame.

8. The apparatus of claim 6, wherein the side information generator assigns one of a plurality of priority levels to each of the plurality of blocks based on the indication of a video quality impact in the side information for each block of pixel data.

9. The apparatus of claim 8, wherein a block of pixel data having a greater video quality impact is assigned a higher priority level than a block of pixel data having a lower video quality impact.

10. The apparatus of claim 9, wherein the block of pixel data assigned with the higher priority is transmitted over a channel having a lower packet loss rate.

11. The method of claim 1, wherein the multiple channels having different loss rates.

12. The apparatus of claim 6, wherein the multiple channels having different loss rates.

13. A non-transitory medium having processor-executable computer program instructions stored thereon, the computer program instructions defining code for:
    generating side information associated with a plurality of blocks of pixel data, the side information providing for each block of the plurality of blocks of pixel data an indication of a video quality impact due to a loss individually of each block of the plurality of blocks of pixel data; and
    transmitting, on multiple channels, a video bitstream comprising at least said plurality of blocks using an adaptive multiple channel selection process between the multiple channels based, at least in part, on the indication of a video quality impact in the side information for each block of the plurality of blocks,
    wherein said generating of the side information comprises:
    estimating concealed pixel values for the plurality of blocks of pixel data in an encoding process;
    calculating, based on estimated concealed pixel values, a distortion that will be caused by a loss of each of the plurality of blocks; and
    calculating a distortion for a current group of pictures based on the calculated distortion of each of the plurality of blocks comprising the current group of pictures.

14. The medium of claim 13, wherein the multiple channels having different loss rates.

15. The medium of claim 13, further comprising assigning one of a plurality of priority levels to each of the plurality of blocks based on the indication of a video quality impact in the side information for each block of pixel data.

16. The medium of claim 15, wherein a block of pixel data having a greater video quality impact is assigned a higher priority level than a block of pixel data having a lower video quality impact.

* * * * *